F. BEAMAN.
AUTOMOBILE RUNNING GEAR.
APPLICATION FILED JULY 22, 1913.

1,095,183.

Patented May 5, 1914.
2 SHEETS—SHEET 1.

Witnesses

F. Beaman
Inventor,
by C. A. Snow & Co.
Attorneys.

F. BEAMAN.
AUTOMOBILE RUNNING GEAR.
APPLICATION FILED JULY 22, 1913.
1,095,183.
Patented May 5, 1914.
2 SHEETS—SHEET 2.
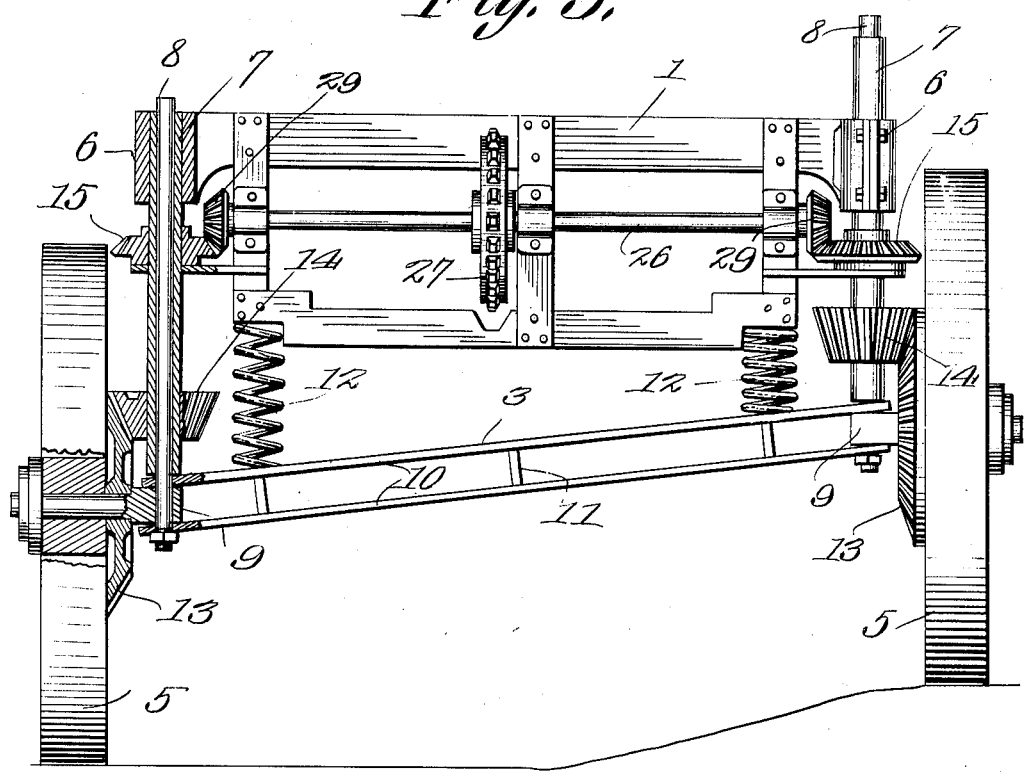
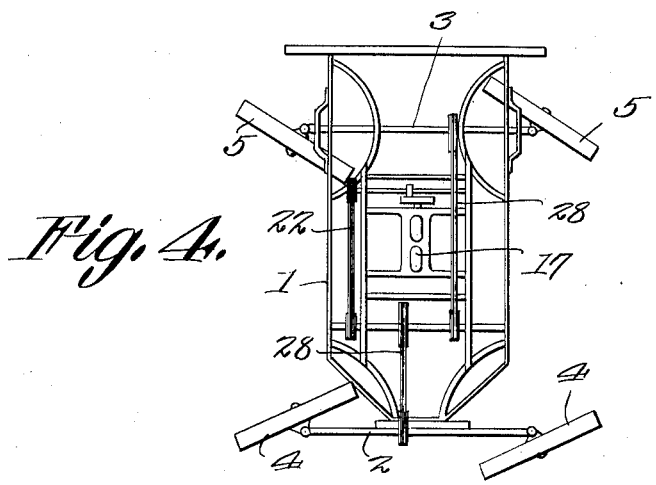
Witnesses
F. Beaman, Inventor,
by C. A. Snow & Co.
Attorneys.

UNITED STATES PATENT OFFICE.

FRED BEAMAN, OF HOUSTON, TEXAS.

AUTOMOBILE RUNNING-GEAR.

1,095,183. Specification of Letters Patent. Patented May 5, 1914.

Application filed July 22, 1913. Serial No. 780,589.

*To all whom it may concern:*

Be it known that I, FRED BEAMAN, a citizen of the United States, residing at Houston, in the county of Harris and State of Texas, have invented a new and useful Automobile Running-Gear, of which the following is a specification.

The present invention appertains generally to automobiles or motor cars, and relates more particularly to running gears therefor.

One of the objects of the present invention is to provide a novel and improved running gear for an automobile, which shall permit both the front and the rear wheels to be driven, for propelling the automobile or vehicle.

Another object of the present invention is to provide a device of the nature indicated wherein the respective driving or ground wheels, are adapted to reciprocate or yield vertically when the machine is traversing rough or uneven soil.

A further object of the present invention is to provide an apparatus of the character specified wherein the power may be continually transmitted to the respective wheels notwithstanding the swinging movements of the wheels for purpose of steering, or the vertical reciprocation of the wheels.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention has been illustrated in its preferred embodiment in the accompanying drawings, which are more or less diagrammatical in nature, and wherein:—

Figure 1:
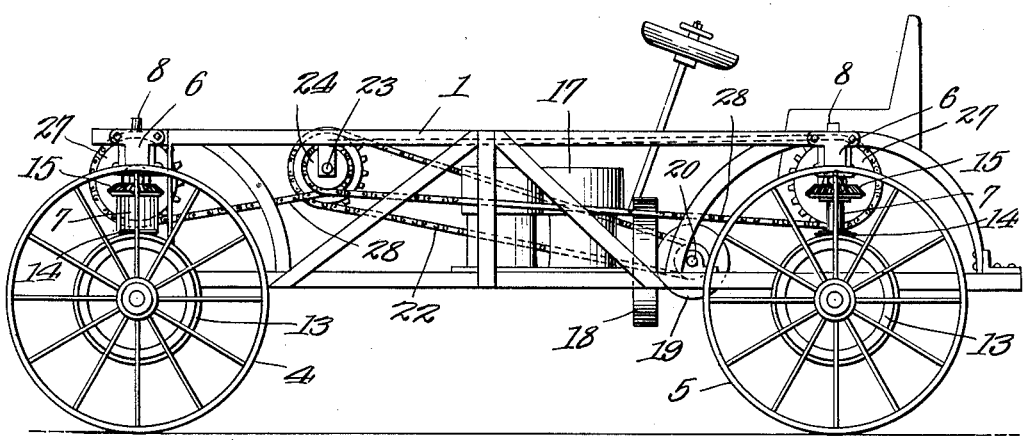
Figure 2:
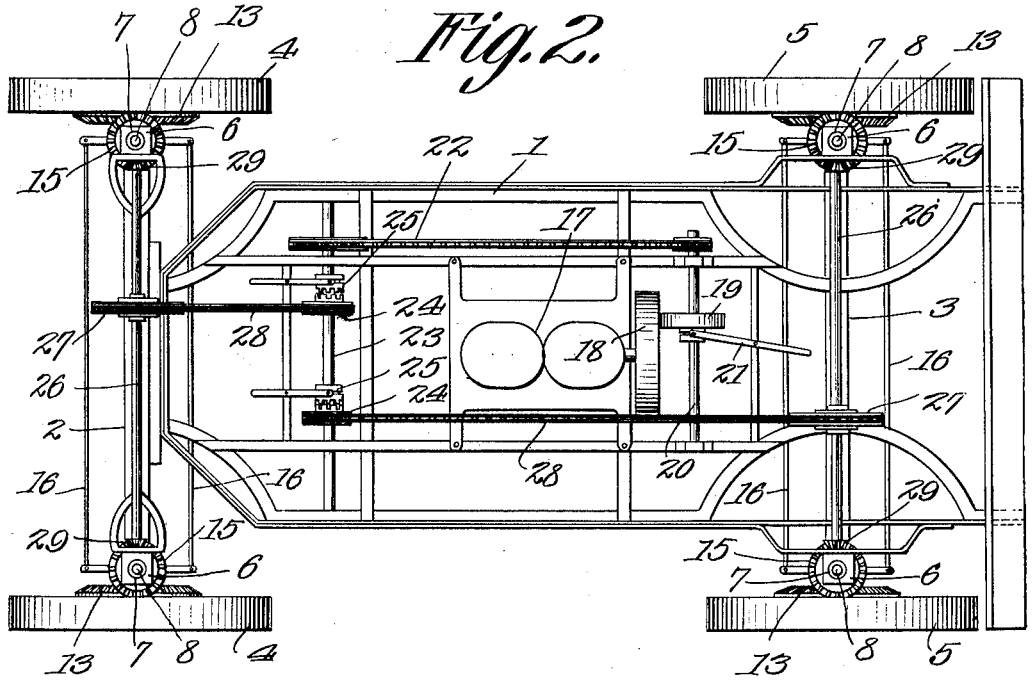

Figure 1 is a side elevation of the improved automobile. Fig. 2 is a plan view thereof. Fig. 3 is an enlarged end view, looking from the rear, and parts being shown in section. Fig. 4 is a reduced diagrammatical plan view of the machine, illustrating how the front and rear wheels may be swung to turn the machine within a small compass or space.

In carrying out the present invention, there is provided a suitable frame 1, preferably constructed of steel, and the front and rear axles 2 and 3, respectively, disposed between the respective front and rear ground wheels 4 and 5. The frame 1 is so constructed, as to permit the front and rear wheels to be swung readily in various directions, and for adapting the machine for farm or other purposes.

The frame 1 is provided with the upright boxings 6 above the ends of the front and rear axles, and upright sleeves or tubular shafts 7 are journaled through the boxings 6, while steering posts or rock shafts 8 are journaled through the sleeves or tubular shaft, so as to protrude beyond the ends of the sleeves 7. Knuckles 9 are secured to or cast integrally with the lower ends of the rock shafts 8 and are provided with outwardly projecting spindles upon which the respective wheels are journaled freely.

Each of the axles is preferably constructed of a pair of superimposed parallel bars 10 connected by stays 11, and the ends of the bars 10 loosely embrace the lower portion of the respective rock shafts 8 above and below the respective knuckles 9, the sleeves 7 having their lower ends spaced slightly from the uppermost bars 10. The sleeves 7 are adapted to slide vertically through the respective boxings 6, the shafts 8 being preferably constrained to slide with the sleeves 7, but rotating freely within the sleeves. It will thus be evident that the respective wheels of the front and rear trucks may reciprocate or yield vertically with respect to one another, without tilting the frame or body 1 of the machine, as seen clearly in Fig. 3. Suitable coiled wire compression springs 12 are disposed between the axles and the frame 1, in order to yieldingly support the frame upon the axles, and in order to permit the wheels to yield when passing over an obstruction or uneven surface.

The front and rear wheels are driven through the medium of the sleeves 7, beveled spur gears 13 being secured to the inner sides of the several wheels, and beveled spur gears 14 being secured to or cast integrally with the sleeves 7 adjoining their lower ends, and intermeshing with the gears 13, whereby the rotation of the sleeves 7 will impart a rotary movement to the several wheels. A beveled spur gear 15 is feathered upon each of the sleeves 7 below the boxing 6, and is constrained from moving vertically with respect to the frame, the frame having projections or members engaging under the beveled gears 15 for maintaining them against gravitation.

The wheels of the front and rear trucks are connected by means of suitable steering rods 16, as seen best in Fig. 2, in order that the wheels of the respective trucks are designed to swing in unison, the front and rear wheels, however, being capable of swinging independently of each other. Any suitable means (not shown) may be attached to the upper ends of the posts or rock shafts 8 for swinging or controlling the respective front and rear wheels independently.

Mounted centrally upon the frame 1 is a suitable motor or prime mover 17, the crank shaft of which carries a brush or friction wheel 18 engaging a brush or friction wheel 19 feathered on a cross shaft 20 journaled to the frame, the brush wheels constituting a variable transmission, which, of course, may be of any other prevailing type. The brush or friction wheel 19 is preferably controlled by means of a lever 21 in order to vary the speed or velocity of the shaft 20 and to thereby vary the velocity of the machine. The shaft 20 is connected to a drive shaft 23 journaled on the frame 1 in advance of the motor 17, by means of a sprocket chain or belt 22, a pair of sprocket wheels 24 being mounted loosely upon the drive shaft 23, and a pair of clutches 25 being feathered on the drive shaft 23 to engage and disengage the respective sprocket wheels 24.

Counter shafts 26 are journaled to the frame above the front and rear axles, and a sprocket wheel 27 is keyed or secured upon each of the counter shafts 26, sprocket chains 28 being trained around the respective sprocket wheels 24 and 27 in order to connect the drive shaft with the respective counter shafts 26. It will be evident that by throwing in one or the other, or both, of the clutches 25, the drive shaft 23 may be operatively connected with the respective counter shaft or counter shafts 26. To the terminals of each counter shaft 26 are keyed or secured the beveled spur gears 29 intermeshing with the respective beveled gears 15 feathered upon the sleeves 7, whereby the counter shafts 26 are operatively connected with the respective sleeves 7.

In use, when the motor 17 is in operation, the respective clutches 25 may be thrown into engagement with the sprocket wheels 24 for actuating either or both sets of driving wheels. It will be noted that when the counter shafts 26 are connected with the drive shaft 23 through the medium of the clutches, the sleeves 7 will be rotated, and consequently, the drive wheels will be actuated, for propelling the machine. It will be noted that the respective front and rear wheels are designed to be swung in various directions, for purpose of steering or guiding the machine, the knuckles 9 being swung through the medium of the shafts or steering posts 8. Attention is also directed to the fact that the respective wheels of each set are adapted to vibrate or yield vertically with respect to one another, without affecting the operation of the machine, the sleeves 7 being adapted to slide through the respective gears 15, as will be apparent. The axles are loosely connected at their ends with the shafts 8 over the knuckles 9, in order to permit the axles to swing as the wheels move vertically with respect to one another.

The present machine is adapted particularly for use in farming or for kindred purposes. Supposing that a plow were carried by the frame 1, and that the machine was employed for plowing the soil within an inclosure or fence, it will be noted that the front and rear wheels being controllable independently of each other, will permit the machine to turn a square corner at the corner of the fence or inclosure, in order that the soil may be plowed or tilled close to the corner fence post. Thus, when the front end of the machine approaches the fence corner, the front wheels may be turned so as to guide the front end of the machine away from the corner, while the rear wheels may be controlled to guide the rear end of the machine toward the corner, after which, the front and rear wheels may be so controlled that the machine will travel away from the fence corner, at an angle to the line of travel in approaching the fence corner. The front and rear wheels both being controllable, for purpose of steering, will permit the machine to be turned about within a small compass or space, as illustrated in Fig. 4. Furthermore, by bringing the front and rear wheels at right angles with respect to the frame, the machine may be propelled sidewise, when occasion necessitates.

In view of the foregoing, taken in connection with the drawing, the advantages and capabilities of the present device will be apparent to those versed in the art, it being noted that the objects aimed at have been carried out satisfactorily.

Having thus described the invention, what is claimed as new is:—

1. In a motor propelled vehicle, a frame, a pair of tubular shafts journaled to the frame for vertical sliding movements, shafts journaled through the tubular shafts, one pair of shafts having spindles, wheels journaled upon the spindles and operatively connected with the other pair of shafts, means for yieldingly supporting the frame from the shafts, and means for rotating those shafts to which the wheels are operatively connected.

2. In a motor propelled vehicle, a frame, a pair of vertical sleeves journaled to the frame for sliding movements, rock shafts journaled through the sleeves and having spindles at their lower ends, wheels journaled on the spindles and operatively connected with the sleeves, means for yieldingly supporting the frame from the sleeves and shafts, and means for rotating the sleeves.

3. In a motor propelled vehicle, a frame, a pair of tubular shafts journaled to the frame for vertical sliding movements, a second pair of shafts journaled through the tubular shafts, spindles carried by one pair of shafts, wheels journaled on the spindles and operatively connected with the other pair of shafts, an axle loosely connected at its terminals with certain shafts, means for yieldingly supporting the frame upon the axle, and means for rotating the last mentioned pair of shafts.

4. In a motor propelled vehicle, a frame, a pair of upright tubular shafts journaled to the frame for vertical sliding movements, a second pair of shafts journaled through the tubular shafts, and having spindles at their lower ends, wheels journaled on the spindles and operatively connected with the respective tubular shafts, an axle loosely connected at its ends with the last mentioned pair of shafts, means for yieldingly supporting the frame from the axle, and means for rotating the tubular shafts.

5. In a motor propelled vehicle, a frame, a pair of tubular shafts journaled to the frame for vertical reciprocatory movements, a second pair of shafts journaled through the tubular shafts, one pair of shafts having knuckles provided with spindles, wheels journaled on the spindles, and operatively connected with the other shafts, an axle loosely connected at its ends to that pair of shafts having the knuckles, means for yieldingly supporting the frame from the axle, and means for rotating the last mentioned pair of shafts.

6. In a motor propelled vehicle, a frame, a pair of vertical sleeves journaled to the frame for reciprocatory movements, shafts journaled through the sleeves and having knuckles at their lower ends, the knuckles having spindles, wheels journaled on the spindles and operatively connected with the sleeves, an axle having its ends engaged loosely to the shafts over the knuckles, means for yieldingly supporting the frame from the axle, and means for rotating the sleeves.

7. In a motor propelled vehicle, a frame having a pair of upright boxings, a pair of sleeves journaled through the boxings, a pair of shafts journaled through the sleeves and having spindles at their lower ends, wheels journaled on the spindles, intermeshing gears secured to the wheels and sleeves, an axle engaged loosely at its ends to the shafts, means for yieldingly supporting the frame upon the axle, gears feathered on the sleeves and constrained against sliding movements with respect to the frame, and means for rotating the last mentioned gears.

In testimony that I claim the foregoing as my own, I have hereto affixed my signature in the presence of two witnesses.

FRED BEAMAN.

Witnesses:
 JOHN W. BRAY,
 E. S. COON.